United States Patent [19]
Fuhrman

[11] 3,872,834
[45] Mar. 25, 1975

[54] ANIMAL CAPTURING AND RESTRAINING DEVICE
[76] Inventor: Richard C. Fuhrman, 1212 W. Flamingo, Seabrook, Tex. 77586
[22] Filed: Oct. 3, 1973
[21] Appl. No.: 402,971

[52] U.S. Cl. ............................................... 119/151
[51] Int. Cl. ............................................. A01k 29/00
[58] Field of Search ........................... 119/151–153, 119/1; 53/139; 294/19

[56] References Cited
UNITED STATES PATENTS
3,052,214  9/1962  Johnson .................................. 119/1
3,402,959  9/1968  Harris .................................... 294/19

Primary Examiner—G. E. McNeill
Attorney, Agent, or Firm—Torres & Berryhill

[57] ABSTRACT

An animal capturing and restraining device comprising: an elongated handle member; a pair of diverging flexible rod members attached to one end of the handle member; and a bag member having an opening at one end thereof. The opening of the bag member may be substantially surrounded by a tunnel-like hem through which the rod members may be inserted for holding the opening in an open position. The device may comprise apparatus for closing the bag opening by advancing the tips through the tunnel-like hem thereby drawing the tips of the rod members together.

15 Claims, 6 Drawing Figures

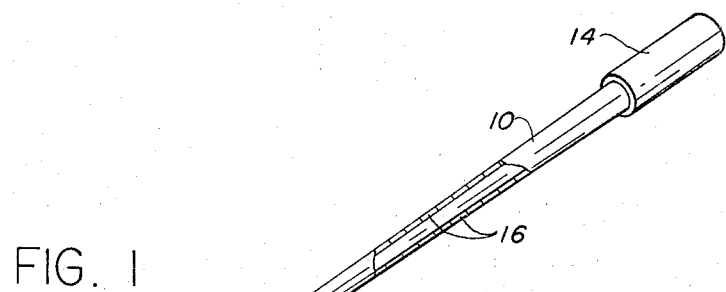
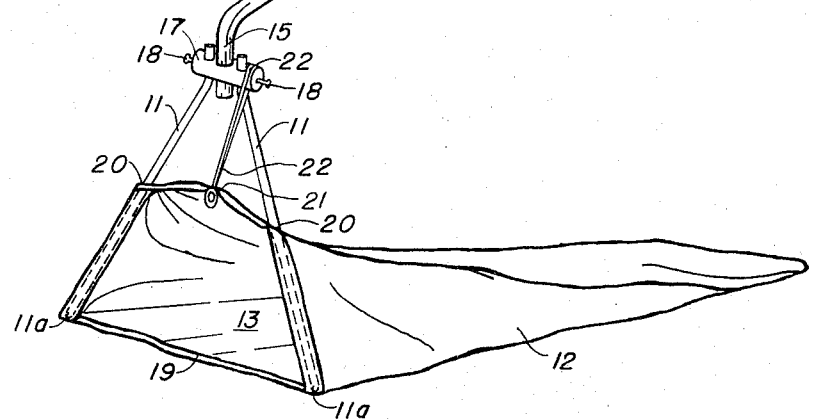
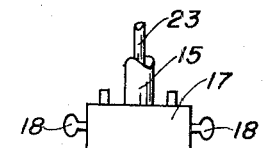
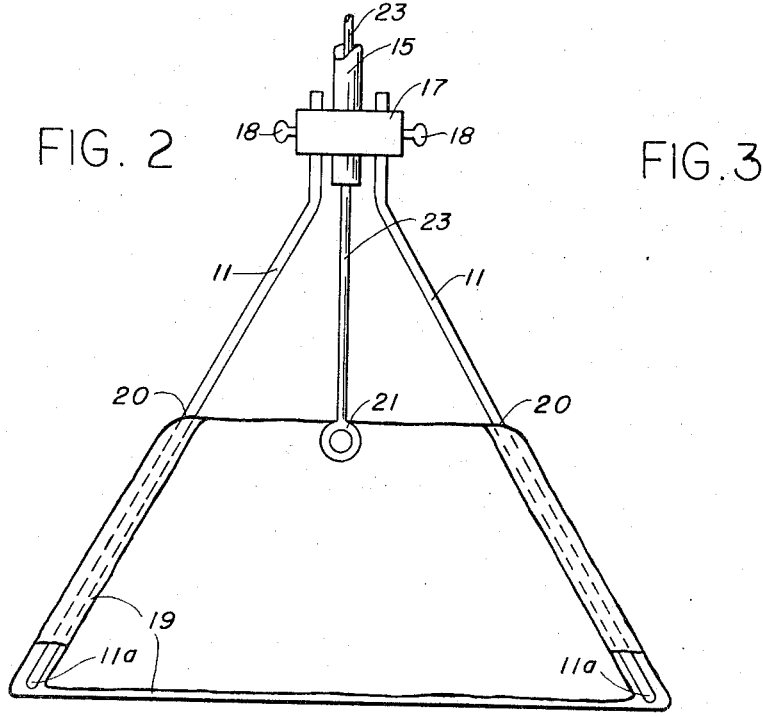

ANIMAL CAPTURING AND RESTRAINING DEVICE

BACKGROUND OF THE INVENTION

1. FIELD OF THE INVENTION

The present invention pertains to animal capture and restraining devices. In particular it pertains to a device for capturing or restraining animals without physical harm.

2. DESCRIPTION OF THE PRIOR ART

Small "butterfly" or "crab" nets have been used in the past primarily for catching fish, birds or flying insects. Such nets have sometimes been used for catching small animals. However, there are several disadvantages of such a device when used for catching small animals. For one thing, the openings of such devices are normally rigidly fixed and circular. The rigidly fixed opening does not allow efficient deployment on the normaly flat surfaces on which small animals would be found. In order to close such a net, it is necessary to rotate the handle causing the bag to pinch shut. This is frequently hard to do withoout allowing the escape of the small animal. Furthermore, when an animal is caught in such a device it usually must be transferred to a secondary cage or retaining device since there is no provision for removing the net from the handle to which it is attached.

Another type of device commonly used in capture of small animals is the "noose" or "snare" device. Such devices may be seen in the following U.S. Pat. Nos.:

2,122,264 - Porter
3,292,591 - Wood
3,540,769 - Rosser

These devices require the encircling of an animal's head, neck, leg, or the like, and the closing of a loop thereabout. The construction of such devices is relatively complex and their operation requires adroitness and skill. Furthermore, they usually require a secondary cage or restraining device for transporting the animal. With these devices, the captured animal is also susceptible to bruises or more serious injuries.

SUMMARY OF THE INVENTION

The animal capturing and restraining device of the present invention comprises: an elongated handle member adapted for gripping by the operator of the device; a pair of diverging flexible rod members attached to one end of the handle member; and a bag member having an opening at one end thereof. The opening may be substantially surrounded by a tunnel-like hem through which the tips of the rod members may be inserted for holding the bag opening in an open position. Such a device is extremely versatile and efficient for capturing and restraining small animals and eliminates the disadvantages of butterfly net and noose devices.

The flexible rod members cause the bag opening to normally assume a substantially triangular or trapezoidal configuration, the sides of which coincide with the rod members and the base of which lies between the rod member tips. Absence of the rods or any other stiff support members, allows the base portion of the opening configuration to conform closely with the surface on which the device is deployed. Thus, the opening may conform to vertical, horizontal or even intersecting planes, such as a wall and a floor, preventing the animal from slipping around the bag or between the bag and the wall. This happens frequently with rigidly framed net devices. The absence of a solid or rigid support at the base of the opening configuration allows unsurpassed conformity with irregular surfaces, even to the extent that the base can be pushed around a branch.

The bag design substantially reduces the possibility of damage to the bag or injury to the animal being captured. The flexible rod members prevent animal injuries by absorbing energy. Furthermore, prolonged handling injury to the animal is prevented since the animal need not be removed from the bag after capture, the throat of the bag being simply tied and, if desired, the bag slipped off the rod members for replacement by another bag.

The bag may be made selectively closeable by simplified, easy to operate apparatus. No complex mechanical devices are required as in some of the snare type capture devices. In addition to being less complex than other capture devices, the present invention is very light in weight and easy to manufacture. The bag of the device may be easily interchanged with bags of different sizes, meshes, etc. In addition to the objects and advantages of the invention specifically enumerated herein, further objects and advantages will become apparent upon reference to the accompanying drawings and specification and claims which follow.

BRIEF DESCRIPTION OF THE DRAWINGS

FIG. 1 is a perspective view of an animal capturing and restraining device according to a preferred embodiment of the invention;

FIG. 2 is a front elevation view of a bag and supporting rod members of an alternate embodiment of the invention, showing the bag in an open position;

FIG. 3 is a front elevation view of the bag and rods of FIG. 2, showing the bag in a substantially closed position;

DESCRIPTION OF PREFERRED EMBODIMENTS

Figure 4:
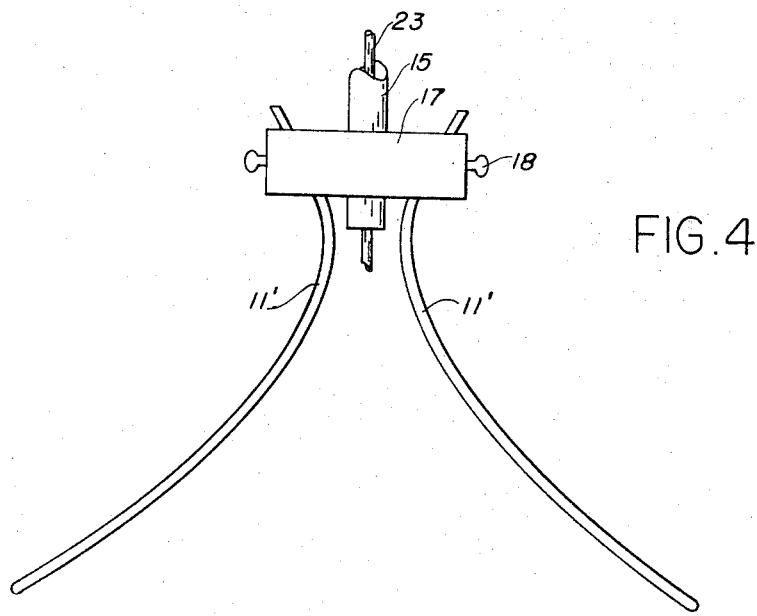
FIG. 4 is a partial front elevation view of an alternative embodiment of the invention, with the bag removed.

Referring first to FIG. 1, the animal capture and restraining device of the present invention comprises an elongated handle member 10, a pair of diverging flexible rod members 11 and a bag member 12 having an opening 13 at one end thereof. The free end of the handle member 10 may be provided with a grip 14 for gripping by the operator of the device. The opposite end of the handle member 10 may be provided with a curved stub 15 of any suitable radius so as to allow the operator to grip the handle grip 14 in a comfortable standing position. The handle member 10, including the grip 14 and stub 15, may be hollow 16 so as to allow the passage of a cable, the purpose of which will be described hereafter.

The flexible rods 11 may be attached to the stub end of the handle 10 in any suitable manner. The mounting shown in the drawings comprises a cylindrical connector block 17 provided with at least three holes, one for receiving the stub 15 and two for receiving the converging ends of the flexible rods 11. Set screws 18 may be provided in the connector block so as to allow assembly and adjustment of the rod members 11.

The rod members diverge away from the connector block 17 terminating in substantially separated tips 11a. They may be manufactured from any suitable high strength flexible material. Nylon or polycarbonate plastic has been found to be highly desirable. In fact, for certain applications, the rods 11, connector block 17 and stub 15 could all be integrally formed, e.g., by injection molding, of a suitable high strength flexible material.

The bag 12 can be manufactured of any suitable bagging or net material. As previously stated the bag is provided with an opening 13 at one end thereof and may be provided with a tunnel-like hem 19 substantially surrounding the opening 13. The hem may be provided with openings 20 allowing the flexible rods 11 to be placed in the hem 19 by flexing the divergent tips 11a together with one hand and slipping the rods into the hem by inserting through holes 20. The rods would then be released, allowing them to again diverge and causing the opening 13 to assume a triangular or trapezoidal configuration. There would be no rods or other supports along the base of the configuration, allowing the base of the opening 13 to substantially conform to the surface on which the device is to be deployed.

For light duty use, the resilience of the flexible rods 11 would be sufficient to retain the bag 12 thereon. For medium and heavy duty use, a grommet connection 21 could be provided for attachment of an elastic cord 22, or other retention means, which would, in turn, be slipped around the connector block 17 to provide additional retention.

In one embodiment of the invention a means for selectively closing the bag opening 13 would be provided. (See FIGS. 2 and 3). In such an embodiment, the elastic cord could be replaced by a cable 23 running through the hollow handle member for manipulation at the grip 14. In this embodiment it would be desirable for the bag opening to assume a trapezoidal configuration, as shown in FIG. 2. Such a configuration could be provided by making the length of the rod members 11 substantially equal to one-half of the perimeter of the bag opening 13. By pulling on the bag grommet 21, through cable 23 at the grip 14, the tips 11a of the divergent rods 11 would be advanced through the hem tunnel 19, causing the tips of the rod members to flex inwardly and eventually converge, effectively closing the opening 13, as shown in FIG. 3.

In use, the grip 14, and possibly other portions of the handle 10 would be gripped by the user and the device would be placed so that the base of the opening configuration 13 would lie substantially on the surface supporting the animal to be captured. The device would be moved along the surface until the animal is forced to enter the bag 12 through the opening 13. Since the rods 11 are flexible, the device could be flexed from side-to-side causing the base and one side of the opening to conform to intersecting planes, such as the floor and walls of a cage, preventing the animal from slipping around the bag. Furthermore, since the rods are flexible and the base of the opening 13 is highly deformable, the device could be employed on highly irregular surfaces, such as the branch of a tree, merely by pushing the base of the opening around the branch.

After the animal has entered the bag 12 the opening 13 can be closed by pulling on the cable 23, in those embodiments so provided. In those embodiments not provided with closing apparatus, the device can be picked up causing the animal to move toward the closed end of the bag 12. After the animal is safely in the bag, the throat of the bag can be brought together and tied and the bag removed from the rods 11. The animal could then be transported to a new location without intermediate transfer or handling. Another bag could be attached to the rods for further use.

It will be noted that in the embodiments of FIGS. 1–3, the rods 11 are substantially straight in the open position. This may be most desirable in some applications, particularly when deployed on a tree limb. However, in an alternate embodiment, illustrated in FIGS. 4–6, the rods are not straight.

As best shown in FIG. 4, the rods 11' of the alternate embodiment, in non-restrained or free-standing positions, are curved outwardly, for example, in a substantially parabolic curve. When the rods are inserted in the bag hem 19, the bag opening 13 assumes a trapezoidal configuration, as shown in FIG. 5, much like the previously described embodiment of FIGS. 1–3.

The bag 12 of the alternate embodiment is provided with two grommet connections 21' and 21'' instead of one, as in the previous embodiment. These connections 21' and 21'' are preferably located at some point intermediate the ends of rods 11' and the new openings 20 through which the rods 11' are inserted.

The cable 23 is modified so as to have wye or forked ends 23' and 23'' for connection with respective grommet connections 21' and 21''. Otherwise the cable 23 is identical to the previous embodiment and functions in much the same manner.

Figure 6:
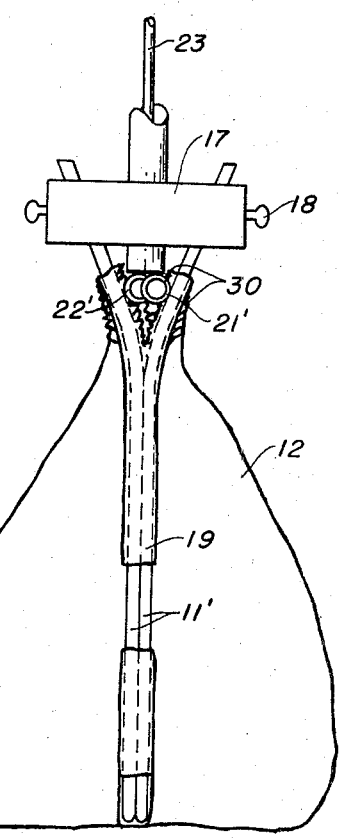
FIG. 6 is a partial front elevation view of the embodiment of FIGS. 4 and 5, showing the bag in a closed position.
Figure 5:
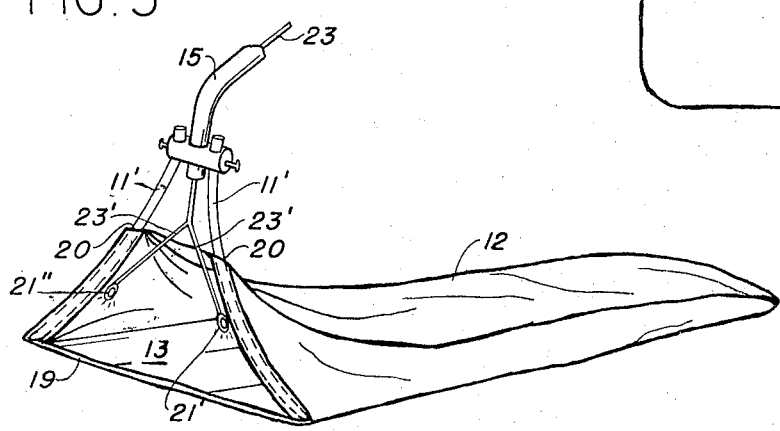
FIG. 5 is a perspective view of the embodiment of FIG. 4 with the bag thereon and in an open position.

It will be appreciated that the alternate embodiment of FIGS. 4–6 allows the bag 12 to be completely closed, as in FIG. 6, whereas the bag in the previous embodiment may be left with a slight opening (See FIG. 3). When a pulling force is applied to the cable, the ends of rods 11' are pulled together and the rods meet, as in FIG. 6, almost in a straight line. The excess bag is bunched together between the base of the rods as at 30.

As can be seen from the foregoing description, the unique features of the present invention combine to produce an animal capture and retaining device which is superior in many ways to those of the prior art. It offers unsurpassed efficiency on many types of surfaces where the animal to be captured is found. Animal injuries from capture and subsequent handling is substantially eliminated. These advantages are obtained with simplified and easily manufactured construction, resulting in a highly useable and desirable capture device.

Although more than one embodiment of the invention have been described herein, there are many other variations which may be made by those skilled in the art without departing from the spirit of the invention. It is therefore intended that the scope of the invention be limited only be the claims which follow.

I claim:

1. An animal capturing and restraining device comprising:
   a. an elongated handle member;
   b. a bag member having an opening at one end thereof;
   c. mounting means attached to said handle member for releasably affixing said bag member at one end of said handle member with said opening in an open position, said mounting means comprising a pair of diverging flexible rod members between the tips of which lies the base of said bag member opening when in said open position; and d. means for flexing said rod members so as to draw said tips together for selectively closing said bag opening.

2. A device as set forth in claim 1 in which said tips of said diverging flexible rod members are insertable into a tunnel-like hem surrounding said bag member to hold said opening in said open position.

3. A device as set forth in claim 1 in which said bag member opening in said open position forms a substantially triangular or trapezoidal figure, the sides of which coincide with said rod members and the base of which lies between the tips of said rod members for substantially conforming with the surface on which said device is to be deployed.

4. A device as set forth in claim 3 in which the length of each of said rods is substantially equal to one half of the perimeter of said bag opening.

5. A device as set forth in claim 3 in which said means for flexing said rod members comprises cable means attached to said bag member at a point near its opening and between said rod members opposite said figure base.

6. A device as set forth in claim 3 in which said means for flexing said rod members comprises cable means attached to said bag member at two points near its opening, one lying along one side of said figure and one lying along the other side of said figure.

7. A device as set forth in claim 6 in which said rods, in non-restrained positions, diverge in a curved path.

8. An animal capturing and restraining device comprising:

a. an elongated handle member adapted for gripping by the operator of said device;

b. a pair of diverging flexible rod members attached to one end of said handle member;

c. a bag member having an opening at one end thereof, said opening being substantially surrounded by a tunnel-like hem through which the tips of said rod members may be inserted for holding said opening in an open position; and d. means attached to said bag member for closing said bag opening by drawing said rod tips together.

9. A device as set forth in claim 8 in which said bag opening normally assumes a substantially triangular or trapezoidal configuration, the sides of which coincide with said rod members and the base of which lies between said rod member tips, allowing said base portion to conform to the surface on which said device is deployed.

10. A device as set forth in claim 9 in which the length of each of said rod members is substantially equal to one half of the perimeter of said bag opening.

11. A device as set forth in claim 9 in which said means for closing said bag opening comprises cable means attached at one end to said bag member and manipulatable at the gripping end of said handle member for closing said opening.

12. A device as set forth in claim 13 in which said cable means is attached to said bag member at a point on the perimeter of said bag opening between said rod members and opposite the base of said configuration.

13. A device as set forth in claim 9 in which said rod members, in non-restrained positions, diverge outwardly in curved paths.

14. A device as set forth in claim 13 in which said means for closing said bag opening comprises cable means attached to the perimeter of said bag opening at at least one point along each of said rod members.

15. A device as set forth in claim 14 in which said cable means comprises a forked end to which said bag opening points are connected, the opposite end of said cable means being manipulatable at the gripping end of said handle member to draw a substantial portion of said rod members together in a straight line when said tips are drawn together.

* * * * *

UNITED STATES PATENT OFFICE
CERTIFICATE OF CORRECTION

Patent No. 3,872,834　　　　　　　　　　Dated　March 25, 1975

Inventor(s)　Richard C. Fuhrman

It is certified that error appears in the above-identified patent and that said Letters Patent are hereby corrected as shown below:

Column 6, line 22, "13" should be -- 11 --;
　　　　　line 27, "9" should be -- 8 --.

Signed and sealed this 1st day of July 1975.

(SEAL)
Attest:

RUTH C. MASON
Attesting Officer

C. MARSHALL DANN
Commissioner of Patents
and Trademarks